G. W. SANDIFORD.
NUT LOCK.
APPLICATION FILED AUG. 18, 1913.
1,096,564.
Patented May 12, 1914.
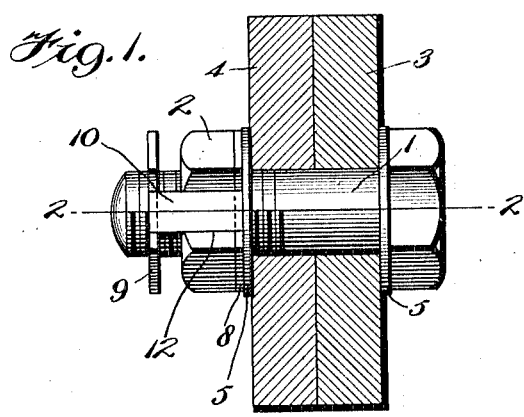
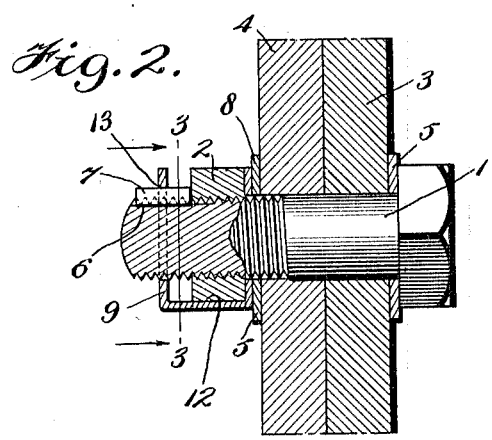
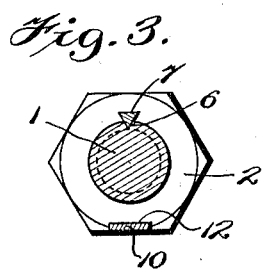
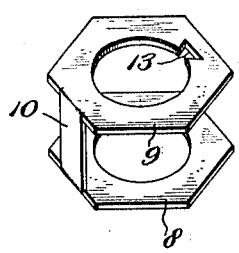
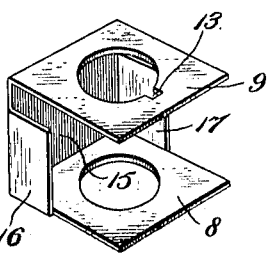
Witnesses
Byron B. Collings.
G. M. Fairbanks.
Inventor
G. W. Sandiford by
F. A. Witherspoon
Attorney

UNITED STATES PATENT OFFICE.

GREEN W. SANDIFORD, OF MOBILE, ALABAMA, ASSIGNOR OF THREE-TWELFTHS TO HIMSELF, THREE-TWELFTHS TO WILLIAM C. BAUMHAUER, TWO-TWELFTHS TO JACOB RUBEL, AND TWO-TWELFTHS TO JACOB MARKSTEIN, ALL OF MOBILE, ALABAMA, AND TWO-TWELFTHS TO PAUL P. LOCKLING, OF FRUITDALE, ALABAMA.

NUT-LOCK.

1,096,564.      Specification of Letters Patent.      Patented May 12, 1914.

Application filed August 18, 1913. Serial No. 785,333.

*To all whom it may concern:*

Be it known that I, GREEN W. SANDIFORD, a citizen of the United States, residing at Mobile, in the county of Mobile and State of Alabama, have invented certain new and useful Improvements in Nut-Locks; and I do hereby declare the following to be a full, clear, and exact description of the invention, such as will enable others skilled in the art to which it appertains to make and use the same.

This invention relates to nut locks, and has for its object to produce a device of this nature which will be simple in construction, comparatively inexpensive to manufacture, and more efficient in action than those heretofore proposed.

With these objects in view the invention consists in the novel details of construction and combinations of parts more fully hereinafter disclosed and particularly pointed out in the claims.

Referring to the accompanying drawings forming a part of the specification, in which like numerals designate like parts in all the views: Figure 1 is an elevational view of a nut lock made in accordance with my invention, showing the parts to be joined in section; Fig. 2 is a sectional view, taken on the line 2—2 Fig. 1, of my invention; Fig. 3 is a top plan and sectional view, taken on the line 3—3, Fig. 2, of my nut lock, looking in the direction of the arrows; Fig. 4 is a perspective view of the locking member; and, Fig. 5 is a like view of a modified form of locking member.

1 indicates any suitable bolt; 2, a nut therefor; 3 and 4, the parts to be held together; and 5, a washer. The bolt is provided with a slot 6 on its threaded end into which fits a wedge shaped key 7. I provide a locking member having the washer like portions 8 and 9 joined by the strip 10, and in the portion 9 I provide the dove-tailed slot 13 for the accommodation of the wedge key member 7. The nut 2 is slotted as at 12 to accommodate the strip 10. Said strip 10 is preferably made of a length greater than the thickness of the nut to be used so that when the nut is screwed up tight the washer member 8 will contact with and be firmly held by the inner face of the nut while the other washer member 9 will be held in spaced relation to the outer face of the nut in order that the key member 7 may be driven into the slots 6 and 13 a distance sufficient to prevent it being easily displaced.

In use the nut 2 is inserted between the washer members 8 and 9; the strip 10 is fitted to the slot 12, and the nut and locking member set up tight on the bolt 1. Since the nut 2 is exposed all around except for the strip 10, and since said strip lies flush with the surface of the nut, no difficulty at all is experienced in using any ordinary wrench for the setting up operation. After the nut is forced home, the key 7 is driven into the slot 6 and dove-tail 13, when the parts are firmly locked in place.

In the modified form of locking member shown in Fig. 5, the connecting strip 15 extends from side to side of the washers 8 and 9, and is further provided with the wings 16 and 17, adapted to hug the nut on opposite sides, so that no slot 13 is necessary in the nut. This form is especially adapted to square nuts, but of course, can also be used with hexagonal nuts.

It is obvious that those skilled in the art may vary the details of construction, as well as the arrangement of parts without departing from the spirit of my invention, and therefore I do not wish to be limited to the above disclosure except as may be required by the claims.

What I claim is:—

1. In a nut lock the combination of a bolt having a longitudinal slot in its threaded portion; a nut fitting said bolt; a locking member adapted to receive said nut and comprising two washer portions joined by a connecting portion adapted to contact with one side of the nut, one of said washer portions being adapted to contact with one face of said nut, the other of said washer portions being spaced from said nut and being provided with a recess adapted to register with said slot; and a key adapted to fit said slot and recess to lock the parts together, substantially as described.

2. In a nut lock the combination of a screw-threaded bolt having a longitudinal slot in its threaded portion; a nut having a slot in one of its faces fitting said bolt; a locking member comprising two washer portions between which said nut is located, joined by a connecting strip fitting the slot in said nut, one of said washer portions being provided with a recess adapted to register with said longitudinal slot; and a key member adapted to be driven into said longitudinal slot and said recess to lock the parts together, substantially as described.

In testimony whereof I affix my signature, in presence of two witnesses.

GREEN W. SANDIFORD.

Witnesses:
Mrs. C. Q. CARMAN,
F. V. MALLEN.

Copies of this patent may be obtained for five cents each, by addressing the "Commissioner of Patents, Washington, D. C."